United States Patent
LaFountain et al.

(10) Patent No.: US 8,264,309 B2
(45) Date of Patent: Sep. 11, 2012

(54) ADJUSTABLE MAGNETIC TARGET

(75) Inventors: Robert L. LaFountain, Charlestown, IN (US); Xueguang Bi, Beijing (CN); Michael Simmons, Louisville, KY (US)

(73) Assignee: General Equipment and Manufacturing Company, Inc., Louisville, KY (US)

( * ) Notice: Subject to any disclaimer, the term of this patent is extended or adjusted under 35 U.S.C. 154(b) by 59 days.

(21) Appl. No.: 12/552,999

(22) Filed: Sep. 2, 2009

(65) Prior Publication Data

US 2011/0050373 A1    Mar. 3, 2011

(51) Int. Cl.
*H01H 7/02*    (2006.01)
*H01H 9/00*    (2006.01)

(52) U.S. Cl. ........................... 335/205; 335/207
(58) Field of Classification Search .......... 335/205–207, 335/302–306; 310/90.5
See application file for complete search history.

(56) References Cited

U.S. PATENT DOCUMENTS

| | | | |
|---|---|---|---|
| 3,437,963 A | | 4/1969 | Gang et al. |
| 4,672,346 A | | 6/1987 | Miyamoto et al. |
| 6,060,969 A | * | 5/2000 | Hufgard et al. ............... 335/207 |
| 6,412,350 B1 | * | 7/2002 | Swift ............................. 73/779 |
| 2008/0074083 A1 | * | 3/2008 | Yarger et al. .................. 320/137 |

FOREIGN PATENT DOCUMENTS

| | | |
|---|---|---|
| DE | 143 670 | 9/1980 |
| EP | 0 051 961 A1 | 5/1982 |
| EP | 1 022 569 A1 | 7/2000 |

OTHER PUBLICATIONS

International Search Report for Intl. Application No. PCT/US2010/045882, mailed Nov. 22, 2010.
International Preliminary Report on Patentability for Intl. Application No. PCT/US2010/045882, mailed Mar. 26, 2012.

* cited by examiner

*Primary Examiner* — Ramon Barrera
(74) *Attorney, Agent, or Firm* — Marshall, Gerstein & Borun LLP

(57) ABSTRACT

A magnetic target is provided for use with a magnetic proximity switch. The magnetic target includes a cylindrical body tube having an open end that partially defines a bore. A stationary magnet is located within the bore opposite the open end, and a movable magnet is disposed within the bore between the stationary magnet and the open end. An adjusting member is received into the bore, and a contact surface of the adjusting member engages the movable magnet. When the adjusting member is axially displaced, the contact surface causes a corresponding displacement of the movable magnet relative to the stationary magnet, eventually causing the magnetic flux field of each magnet to expand in a radial direction away from the longitudinal axis of each magnet. The stationary magnet and the movable magnet may be either axially-magnetized samarium-cobalt magnets or axially-magnetized neodymium magnets.

21 Claims, 4 Drawing Sheets

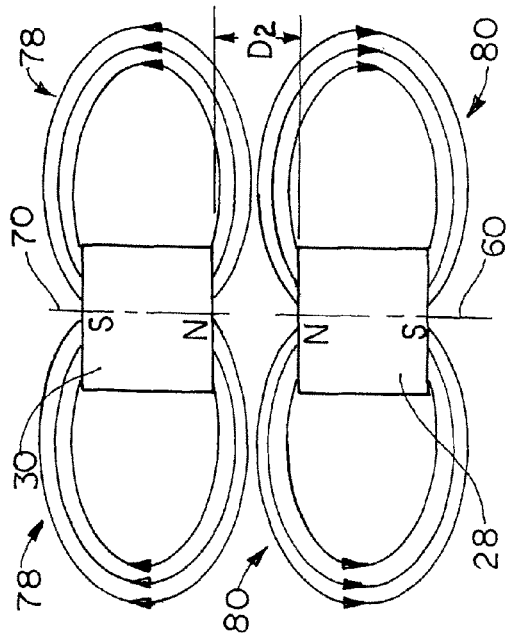
FIG.3c
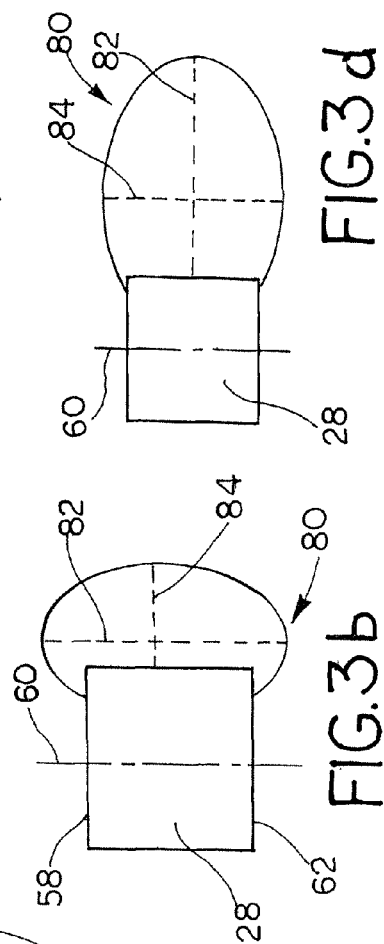
FIG.3d
FIG.3b
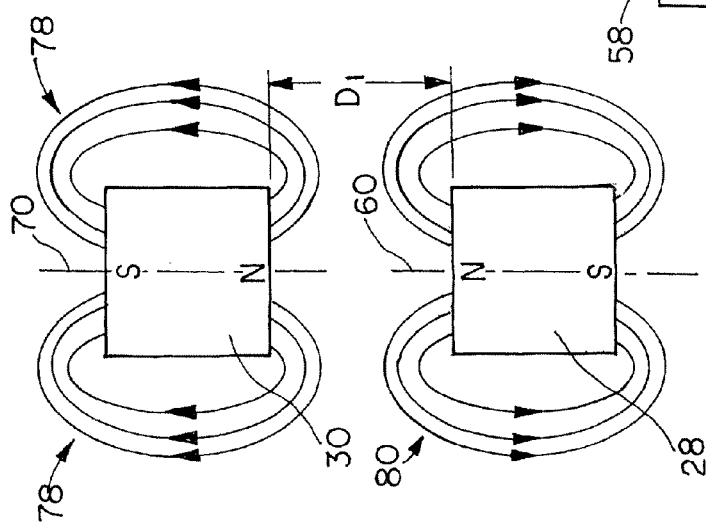
FIG.3a

ADJUSTABLE MAGNETIC TARGET

FIELD OF THE DISCLOSURE

This disclosure relates generally to magnetic proximity switches, and, more particularly, to a magnetic target that is detected by a sensor of a magnetic proximity switch.

BACKGROUND

Magnetic proximity switches, also known as limit switches, are commonly used for linear position sensing. Typically, magnetic proximity switches include a target and a sensor, the sensor being coupled to a switching circuit having two leaf portions, a stationary portion and a movable portion hermetically sealed within a glass enclosure that is itself contained within a switch body. When the target, which generally includes a permanent magnet contained within a housing, passes within a predetermined range of the sensor, the magnetic flux generated by the target magnet causes the movable leaf to contact the stationary leaf, thereby closing the switch.

The ability of the sensor to detect the position of the magnetic target without the need for physical contact allows the magnetic proximity switch to be used in applications where the target is contained inside a sealed housing and the sensor is located outside of the housing. For example, a main steam isolation valve (MSIV) is a gate valve that is placed between a turbine and a boiler in a nuclear reactor system. The MSIV is used to cut off steam flow between the boiler and the turbine if radioactive material leaks into the steam supply. Because of the need to securely contain the radioactive material, the MSIV is housed within a secure pressure vessel. A magnetic target coupled to the valve stem of the gate of the MSIV allows a sensor positioned outside of the pressure vessel to detect whether the gate has reached a particular position, such as a position in which the MSIV is closed.

In applications like the MSIV described above, the magnetic target and the sensor are usually separated by a relatively large distance. In such cases, the magnetic target frequently includes a cylindrical radially-magnetized samarium cobalt (SmCo) magnet 10. It is recognized that such a SmCo magnet 10 has a strong magnetic flux field 12, illustrated in FIG. 1, having the general shape of a partial ellipse that intersects the top and bottom surface of the SmCo magnet 10. The partial ellipse has a major axis 14 normal to the longitudinal axis 16 of the magnet 10 such that the ellipse is elongated away from the longitudinal axis 16. Because a sensor 18 detects components of the flux field 12 that perpendicularly intersect a planar detection surface 20 of the sensor 18, one skilled in the art will appreciate that the elongated shape of the flux field 12 of the SmCo magnet 10 enables the sensor 18 to detect the SmCo magnet 10 when the SmCo magnet 10 is relatively far from the longitudinal axis 16.

A further feature of the radially-magnetized SmCo magnet 10 is that the flux field is substantially uniform about the longitudinal axis of the magnet. Consequently, if a sensor detects the flux field at a particular point in space, the radially-magnetized SmCo magnet can be rotated about its longitudinal axis without affecting the sensor's ability to detect the magnet's flux field. Such longitudinal uniformity may be desirable in applications where the magnetic target is coupled to a valve element that may rotate, such as a valve stem of an MSIV.

However, there may be significant drawbacks to the use of radially-magnetized SmCo magnets. Specifically, radially-magnetized SmCo magnets are difficult, and expensive, to manufacture. While traditional magnets are cheap and simple to produce, such magnets have relatively weak magnetic flux fields that are unable to be detected when a barrier, such as a pressure vessel wall, separates the magnet from the sensor. The flux fields of such magnets are also longitudinally non-uniform, and therefore a slight rotation of the magnet relative to a stationary sensor could render the target undetectable to the sensor. Axially-magnetized SmCo magnets are also cheaper and easier to manufacture than radially-magnetized SmCo magnets, but the elliptical flux fields of such magnets have a major axis that is parallel, not normal, to the longitudinal axis of the magnet. One skilled in the art would recognize that a sensor must be relatively close to an axially-magnetized SmCo magnet to detect such a flux field, making such a magnet unsuitable for applications that require a relatively large distance between the sensor and the target.

Therefore, there exists a need for an inexpensive and easy-to-manufacture alternative to the radially-magnetized SmCo magnet, without compromising the strength and longitudinal uniformity of the radially-magnetized SmCo magnet's flux field.

BRIEF SUMMARY OF THE DISCLOSURE

In accordance with one exemplary aspect of the present invention, a magnetic target assembly includes a body tube having an open proximal end, a distal end opposite the proximate end, and a distal surface adjacent to the distal end. The open end defines a bore longitudinally disposed within the body tube. The magnetic target assembly also includes an adjusting member having an adjustment portion and an engagement portion coupled to the adjustment portion. A contact surface is disposed adjacent to a distal end of the engagement portion, and the engagement portion is received into the bore and displaceably coupled to the body tube. The magnetic target assembly further includes a stationary magnet disposed within the bore such that a second pole of the stationary magnet is proximate to the distal end of the body tube and a first pole of the stationary magnet is opposite the second pole. Also included is a movable magnet disposed within the bore between the adjusting member and the stationary magnet such that a first pole of the movable magnet is adjacent to the first pole of the stationary magnet and a second pole of the movable magnet is proximate to the contact surface of the adjusting member. A top surface of the movable magnet is arranged to engage the contact surface of the adjusting member such that a longitudinal displacement of the adjusting member towards the distal end of the body tube displaces the movable magnet towards the stationary magnet. This displacement causes a magnetic flux field of the stationary magnet to extend away from a longitudinal axis of the stationary magnet and a magnetic flux field of the movable magnet to extend away from a longitudinal axis of the movable magnet.

In another embodiment, the stationary magnet and the movable magnet are both cylindrical axially-magnetized samarium-cobalt magnets or are both cylindrical axially-magnetized neodymium magnets.

In yet another embodiment, the bore has a threaded portion adjacent to the proximal end adapted to couple to a threaded portion of the engagement portion of the adjusting member such that a rotation of the adjusting member relative to the body tube results in the longitudinal displacement of the adjusting member. In one more embodiment, the adjustment portion comprises a flanged end integrally formed with the engagement portion.

In a further embodiment, the first pole of both the stationary magnet and the movable magnet is north, and the second pole of both the stationary magnet and the movable magnet is south. In an alternate embodiment, the first pole of both the stationary magnet and the movable magnet is south, and the second pole of both the stationary magnet and the movable magnet is north.

In accordance with another exemplary aspect of the present invention, a system of determining the position of a valve element includes a valve disposed within a housing, and the valve having a gate coupled to a valve stem. A magnetic target is also coupled to the valve stem, and the magnetic target includes a body tube having an open proximal end, a distal end opposite the proximate end, and a distal surface adjacent to the distal end. The open end defines a bore longitudinally disposed within the body tube. The magnetic target assembly also includes an adjusting member having an adjustment portion and an engagement portion coupled to the adjustment portion. A contact surface is disposed at a distal end of the engagement portion, and the engagement portion is received into the bore and displaceably coupled to the body tube. The magnetic target assembly further includes a stationary magnet disposed within the bore such that a second pole of the stationary magnet is proximate to the distal end of the body tube and a first pole of the stationary magnet is opposite the second pole. Also included is a movable magnet disposed within the bore between the adjusting member and the stationary magnet such that a first pole of the movable magnet is adjacent to the first pole of the stationary magnet and a second pole of the movable magnet is proximate to the contact surface of the adjusting member. A top surface of the movable magnet is arranged to engage the contact surface of the adjusting member such that a longitudinal displacement of the adjusting member towards the distal end of the body tube displaces the movable magnet towards the stationary magnet. This displacement causes a magnetic flux field of the stationary magnet to extend away from a longitudinal axis of the stationary magnet and a magnetic flux field of the movable magnet to extend away from a longitudinal axis of the movable magnet. A magnetically-triggered proximity switch having a sensor at a proximate end of the switch is also included, and the magnetically triggered proximity switch is stationary and disposed outside of the housing. The sensor of the magnetically-triggered proximity switch is adapted to detect the magnetic flux field of the stationary magnet or the magnetic flux field of the movable magnet.

In another embodiment, the stationary magnet and the movable magnet are both cylindrical axially-magnetized samarium-cobalt magnets or are both cylindrical axially-magnetized neodymium magnets.

In yet another embodiment, the bore has a threaded portion adjacent to the proximal end adapted to couple to a threaded portion of the engagement portion of the adjusting member such that a rotation of the adjusting member relative to the body tube results in the longitudinal displacement of the adjusting member. In one more embodiment, the adjustment portion comprises a flanged end integrally formed with the engagement portion.

In a further embodiment, the first pole of both the stationary magnet and the movable magnet is north, and the second pole of both the stationary magnet and the movable magnet is south. In an alternate embodiment, the first pole of both the stationary magnet and the movable magnet is south, and the second pole of both the stationary magnet and the movable magnet is north. In yet another embodiment, the housing is a contained housing.

In accordance with one more exemplary aspect of the present invention, a method of simulating the magnetic flux field of a radially-magnetized permanent magnet using two axially-magnetized permanent magnets includes the step of providing an axially-magnetized first permanent magnet having a first pole, a second pole, and a first magnetic flux field. An axially-magnetized second permanent magnet having a first pole, a second pole, and a second magnetic flux field is also provided. The first permanent magnet and the second permanent magnet are positioned such that a longitudinal axis of the first permanent magnet is substantially coaxial with a longitudinal axis of the second permanent magnet, and the first pole of the first permanent magnet is proximate to the first pole of the second permanent magnet. The first permanent magnet and the second permanent magnet are separated by a longitudinal distance. A mechanism to reduce the longitudinal distance between the first permanent magnet and the second permanent magnet is provided, thereby causing the first magnetic flux field of the first permanent magnet to extend away from a longitudinal axis of the first permanent magnet and the second magnetic flux field of the second permanent magnet to extend away from a longitudinal axis of the second permanent magnet.

In another embodiment, the first permanent magnet and the second permanent magnet are both cylindrical axially-magnetized samarium-cobalt magnets or are both cylindrical axially-magnetized neodymium magnets.

In a further embodiment, the first pole of both the first permanent magnet and the second permanent magnet is north, and the second pole of both the first permanent magnet and the second permanent magnet is south. In an alternate embodiment, the first pole of both the first permanent magnet and the second permanent magnet is south, and the second pole of both the first permanent magnet and the second permanent magnet is north.

In yet another embodiment, the first permanent magnet and the second permanent magnet are positioned within a bore of a body tube. In a still further embodiment, the mechanism to reduce the longitudinal distance between the first permanent magnet and the second permanent magnet includes an adjusting member having a threaded portion that engages a threaded portion within the bore of the body tube such that a rotation of the adjusting member relative to the body tube results in the longitudinal displacement of the adjusting member.

In a still further embodiment, a valve having a displaceable gate within a contained valve housing is provided, and the gate is secured to a displaceable valve stem. The mechanism to reduce the longitudinal distance between the first permanent magnet and the second permanent magnet is coupled to the body tube, and the body tube is secured to the valve stem. A sensor is provided that is outside of the valve housing. The sensor is capable of detecting either the first magnetic flux field or the second magnetic flux field when the valve stem is displaced to a desired location.

BRIEF DESCRIPTION OF THE DRAWINGS

FIGS. 3a, 3b, 3c, and 3d are various views of the flux fields of axially-magnetized SmCo magnets.

DETAILED DESCRIPTION

Figure 1:
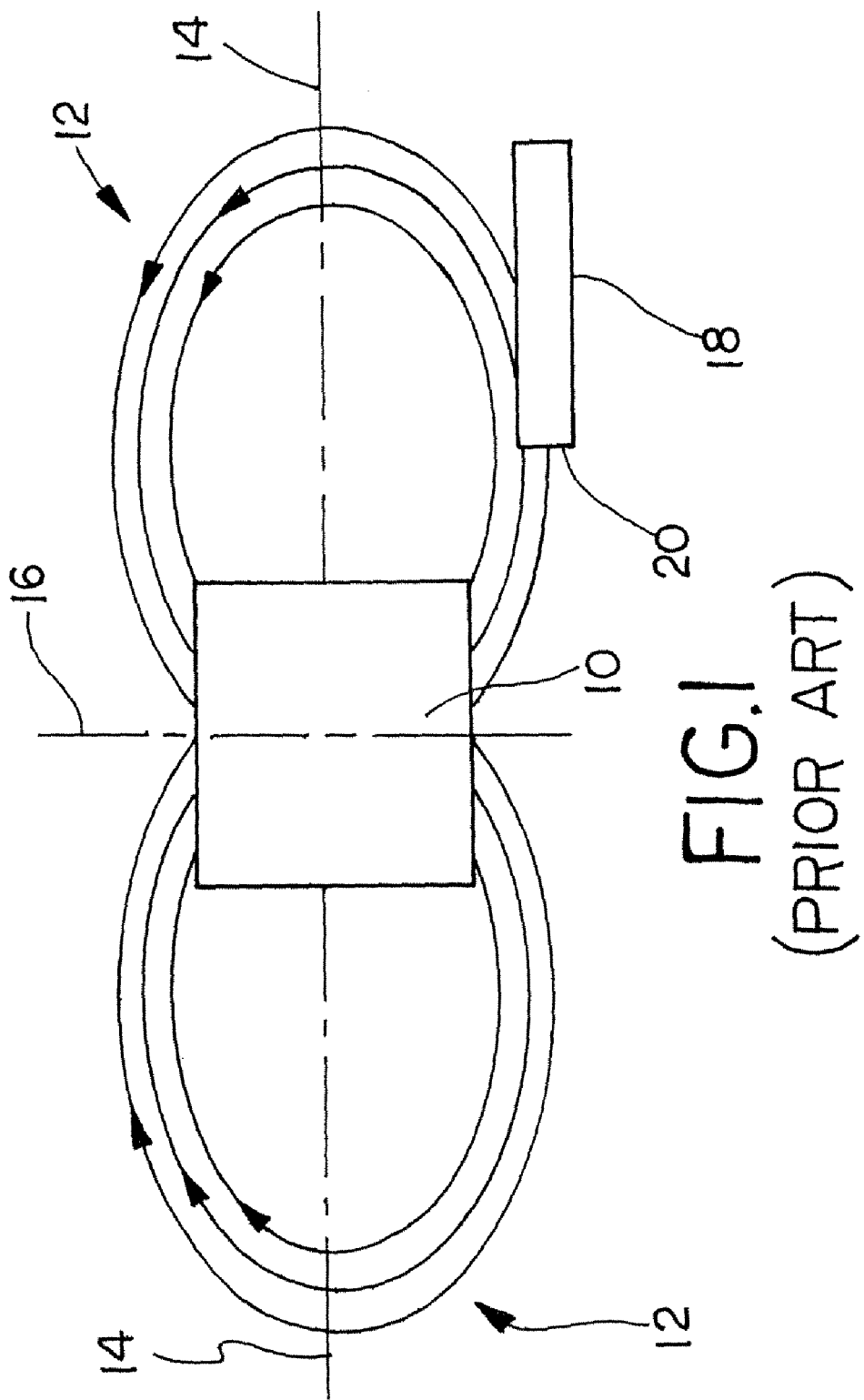
FIG. 1 is a side view of a radially-magnetized SmCo magnet and a sensor.
Figure 2:
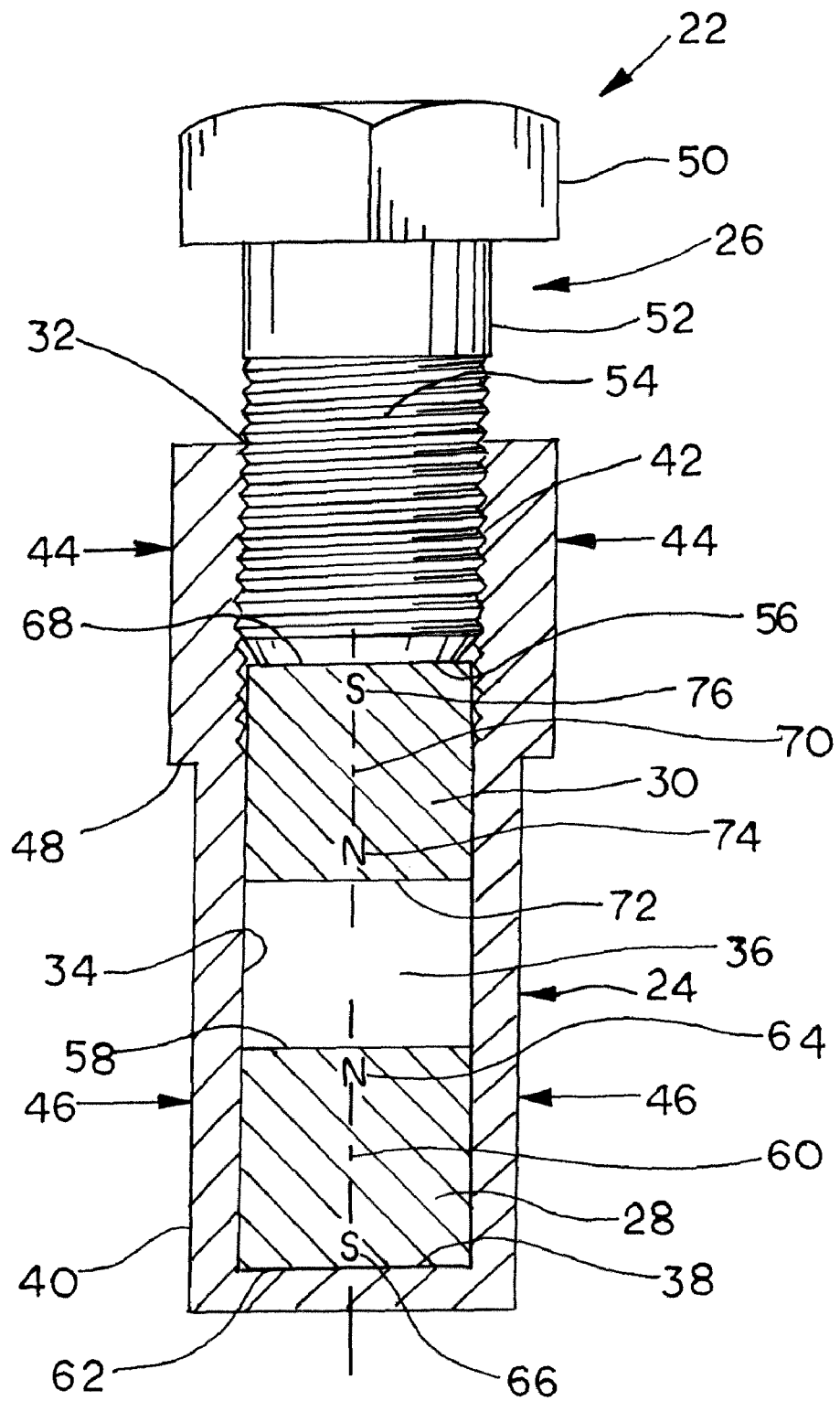
FIG. 2 is a cross-sectional side view of an adjustable magnetic target.

As illustrated in FIG. 2, an adjustable magnetic target 22 includes a body tube 24 and an adjusting member 26 that is longitudinally received into the body tube 24. A stationary axially-magnetized SmCo magnet 28 is disposed within the body tube 24, and a movable axially-magnetized SmCo magnet 30 is also disposed within the body tube 24 between the adjusting member 26 and the stationary SmCo magnet 28. The movable SmCo magnet 30 engages the adjusting member 26 such that when the adjusting member 26 is displaced either towards or away from the stationary SmCo magnet 28, the movable SmCo magnet 30 is also displaced towards or away from the stationary SmCo magnet.

FIG. 2 shows a cross-sectional view of the body tube 24. The body tube 24 preferably has a generally cylindrical shape having a circular cross-section. However, the body tube 24 may have any cross-sectional shape, such as a polygon or an oval, for example. The body tube 24 may be formed from metal or plastic, and may be manufactured using conventional processes, such as casting, injection-molding, or extrusion, for example. The body tube 24 may have an open proximal end 32 that receives the adjusting member 26. The proximal end 32 and an interior surface 34 may partially define a bore 36 extending longitudinally through the body tube 24. The bore 36 may be further defined by a distal surface 38 disposed adjacent to a distal end 40 of the body tube 24, the distal end 40 being generally longitudinally opposite the proximal end 32. A threaded portion 42 may be formed on the interior surface 34 adjacent to the proximal end 32 of the body tube 24. The body tube 24 may also have a first external cross-sectional diameter 44, and a second cross-sectional diameter 46 smaller than the first diameter 44, thereby creating a shoulder 48.

Still referring to FIG. 2, the adjustable magnetic target 22 also includes an adjusting member 26 having an adjustment portion 50 and an engagement portion 52 secured to the adjustment portion 50. The adjustment portion 50 may be integrally formed with the engagement portion 52, and may have a flanged polygonal shape adapted to be engaged by a wrench or other tool. The engagement portion 52 may be generally cylindrical in shape and may have an outer diameter slightly less than the diameter of the bore 36 of the body tube 24. The engagement portion 52 may have a threaded portion 54 configured to engage the threaded portion 42 of the body tube 24 such that a rotation of the adjusting member 26 in a first direction normal to the longitudinal axis of the adjusting member 26 longitudinally displaces the adjusting member 26 towards the distal end 40 of the body tube 24, while a rotation of the adjusting member 26 in a second direction opposite the first direction longitudinally displaces the adjusting member 26 away from the distal end 40 of the body tube 24. The adjusting member 26 may also include a contact surface 56 located at the distal end of the engagement portion 52. The contact surface 56 may be a flat surface substantially normal to the longitudinal axis of the adjusting member 26, as illustrated in FIG. 2. However, the contact surface 56 may be any surface capable of providing a point of contact between the adjusting member 26 and the movable SmCo magnet 30.

Again referring to FIG. 2, the adjustable magnetic target 22 also includes a stationary axially-magnetized samarium cobalt (SmCo) magnet 28 disposed within the body tube 24 adjacent to the distal end 40. The stationary SmCo magnet 28 may have a circular cross-section giving the stationary SmCo magnet 28 a generally cylindrical shape, and the outer diameter of the stationary SmCo magnet 28 may be slightly smaller than the bore 36 of the body tube 24. However, the stationary SmCo magnet 28 may have any cross-sectional shape, such as that of an oval or polygon, for example. A top surface 58 of the stationary SmCo magnet 28 may be planar and may be disposed generally normal to a longitudinal axis 60 of the stationary SmCo magnet 28. A bottom surface 62 of the stationary SmCo magnet 28 may also be planar and generally parallel to the top surface 58, wherein the bottom surface 62 of the stationary SmCo magnet 28 contacts the distal surface 38 of the body tube 24. The stationary SmCo magnet 28 has a first pole 64 (identified as north in FIG. 2) proximate to the top surface 58 and a second pole 66 (identified as south in FIG. 2) proximate to the bottom surface 62.

The adjustable magnetic target 22 also includes a movable SmCo magnet 30 disposed within the body tube 24, as shown in FIG. 2. The movable SmCo magnet 30 may have physical and magnetic properties identical to the stationary SmCo magnet 28. Specifically, the movable SmCo magnet 30 may be axially-magnetized, and may be cylindrical in shape, having an outer diameter slightly smaller than the bore 36 of the body tube 24. A top surface 68 of the movable SmCo magnet 30 may be planar and may be disposed generally normal to a longitudinal axis 70 of the movable SmCo magnet 30. A bottom surface 72 of the movable SmCo magnet 30 may also be planar and generally parallel to the top surface 68. The movable SmCo magnet 30 also has a first pole 74 (identified as north in FIG. 2) proximate to the bottom surface 72 and a second pole 76 (identified as south in FIG. 2) proximate to the top surface 68. As shown in FIG. 2, the movable SmCo magnet 30 may be disposed within the bore 36 of the body tube 24 between the contact surface 56 of the adjusting member 26 and the stationary SmCo magnet 28 such that the first pole 74 of the movable SmCo magnet 30 is adjacent to the first pole 64 of the stationary SmCo magnet 30. Due to a repulsive magnetic force, the movable SmCo magnet 30 is biased away from the stationary SmCo magnet 28 such that a portion of the top surface 68 of the movable SmCo magnet 30 engages a portion of the contact surface 56 of the adjusting member 26. The same effect can be achieved if the first pole 64 of the stationary SmCo magnet 28 is south, and the first pole 74 of the movable SmCo magnet 30 is south. Both the axially-magnetized stationary SmCo magnet 28 and the movable SmCo magnet 30 are manufactured using materials and processes that are well known in the art.

The stationary axially-magnetized SmCo magnet 28 and the movable axially-magnetized SmCo magnet 30 are each permanent magnets having a magnetic flux field. When the magnets 28, 30 are separated by an initial distance $D_1$, as illustrated in FIG. 3a, the magnetic flux field 78 of the stationary SmCo magnet 28 and the magnetic flux field 80 of the movable SmCo magnet 30 each has the general shape of a partial ellipse. Using the stationary SmCo magnet 28 as an example, the generally elliptical flux field 80 extends from the top surface 58 to the bottom surface 62 and has a major axis 82 that is parallel to the longitudinal axis 60 of the stationary SmCo magnet 28 and a minor axis 84 that is normal to the longitudinal axis 60, as shown in FIG. 3b. As the movable SmCo magnet 30 is longitudinally displaced towards the stationary SmCo magnet 28, the flux field 78 of the movable SmCo magnet 30 eventually begins to interact with the flux field 80 of the stationary SmCo magnet 28. Once within this zone of interaction, such as when the movable SmCo magnet 30 is separated from the stationary SmCo magnet 28 by a distance $D_2$ as shown in FIG. 3c, the shapes of the flux fields 78, 80 begin to change. Specifically, as illustrated by the stationary SmCo magnet of FIG. 3d, the elliptical flux field 80 stretches away from the longitudinal axis 60 of the stationary SmCo magnet 28 in a radial direction such that the major axis 82 is now normal to the longitudinal axis 60 and the minor axis 84 is parallel to the longitudinal axis 60. The interaction causes a similar change to the flux field 78 of the movable SmCo magnet 30. Consequently, the mutual interaction of the flux fields 78, 80 of the axially-magnetized SmCo magnets 28, 30 cause each of the flux fields 78, 80 to simulate the shape of the flux field 12 of a radially-magnetized SmCo magnet 10.

Once the magnets are within the zone of interaction, the shape of the flux fields 78, 80 can be adjusted by longitudinally displacing the movable SmCo magnet 30 relative to the stationary SmCo magnet 28. For example, if a sensor was to be positioned relatively far from the adjustable magnetic target 22, the adjusting member 26 of the magnetic target 22 may be rotated such that the movable SmCo magnet 30 is displaced towards the stationary SmCo magnet 30, thereby causing the flux fields 78, 80 to expand radially away from the longitudinal axes 60, 70 of the magnets 28, 30. The rotation of the adjusting member 26 is continued until the flux fields 78, 80 extend sufficiently outward to be detected by the sensor.

Figure 4A:
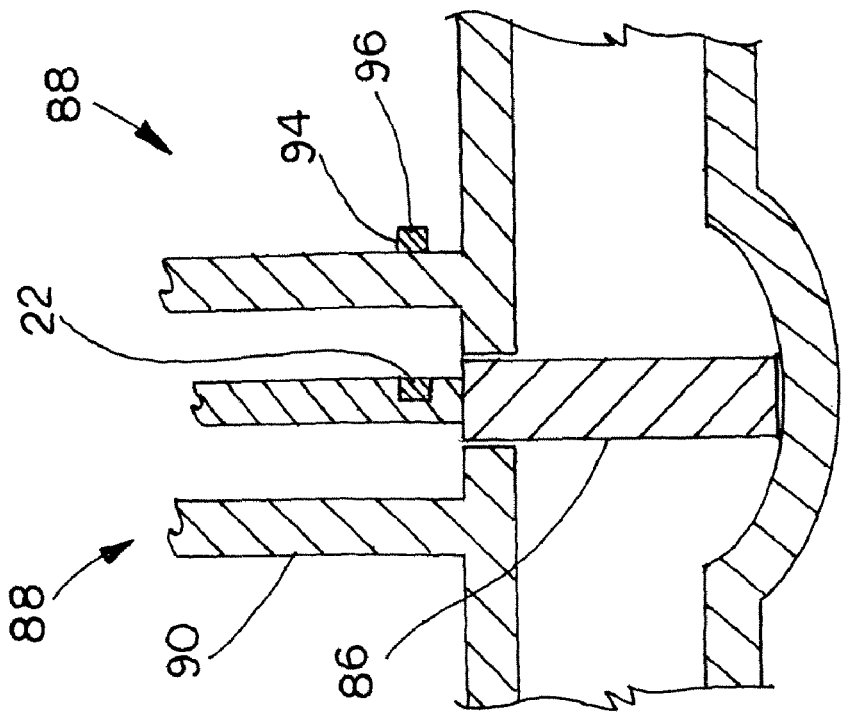
FIGS. 4a and 4b are cross-sectional side views of a gate valve having a magnetic target secured to the valve stem and a sensor located outside of the valve housing.
Figure 4B:
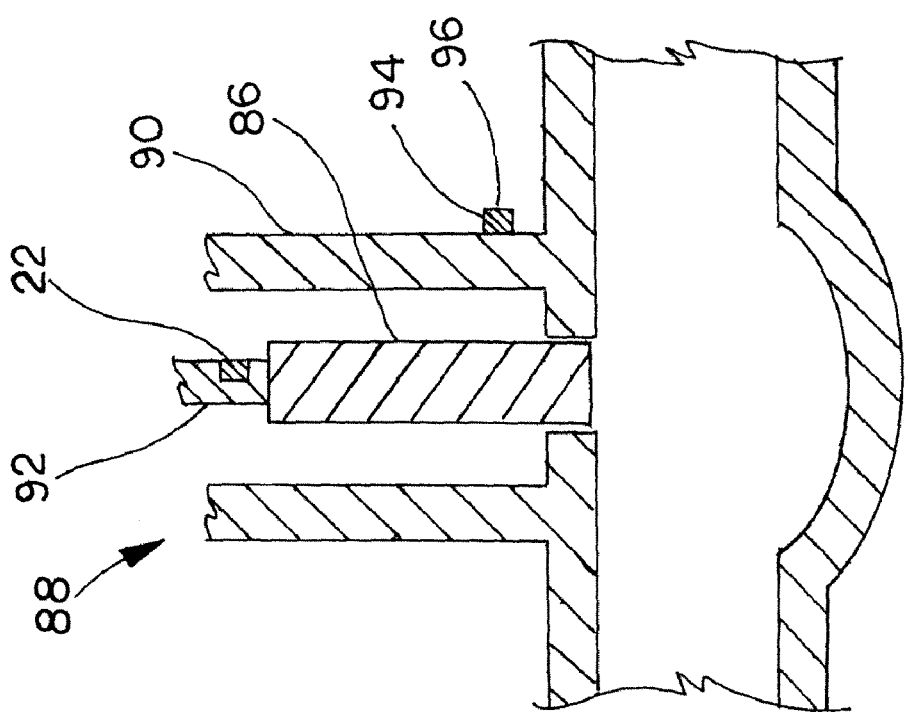

The simulation of the flux field of the radially-magnetized SmCo magnet 10 allows the axially-magnetized SmCo magnets 28, 30 to be used in place of the radially-magnetized SmCo magnet 10 in applications requiring a relatively large distance between the magnet and a sensor. For example, as illustrated in FIGS. 4a and 4b (not to scale), when it is desired to determine whether a gate 86 of a valve 88 has displaced to a particular point within a sealed valve housing 90, the adjustable magnetic target 22 may be coupled to a valve stem 92. In FIG. 4a, the gate 86 is in a first position such that the adjustable magnetic target 22 coupled to the stem 92 is outside of the detection range of the sensor 94 of a magnetic proximity switch 96, such as a GO Switch® manufactured by TopWorx, Inc. However, as illustrated in FIG. 4b, when the gate 86 is displaced to a second position, such as a closed position, the adjustable magnetic target 22 is within the detection range of the sensor 94, and the magnetic proximity switch 96 changes state. A signal indicating the change in state of the magnetic proximity switch 96 may sent to a controller (not shown), and an alert in the form of an LED or an alarm (not shown) can be triggered to indicate that the valve has been closed.

While various embodiments have been described above, this disclosure is not intended to be limited thereto. Variations can be made to the disclosed embodiments that are still within the scope of the appended claims. For example, the stationary magnet 28 and the movable magnet 30 have been described as samarium cobalt (SmCo) magnets. However, other types of magnets could also be used, such as neodymium magnets and Alnico magnets, for example.

What is claimed is:

1. A magnetic target assembly comprising:
  a magnetic target adapted to be coupled to a valve closure member, the valve closure member being disposed within a valve enclosure and being displaceable relative to the valve enclosure, the magnetic target comprising:
    a body tube having an open proximal end, a distal end opposite the proximal end, and a distal surface adjacent to the distal end, the open proximal end defining a bore longitudinally disposed within the body tube;
    an adjusting member having an adjustment portion, an engagement portion coupled to the adjustment portion, and a contact surface disposed adjacent to a distal end of the engagement portion, wherein the engagement portion is received into the bore and is displaceably coupled to the body tube;
    a stationary magnet disposed within the bore such that a second pole of the stationary magnet is proximate to the distal end of the body tube and a first pole of the stationary magnet is opposite the second pole; and
    a movable magnet disposed within the bore between the adjusting member and the stationary magnet such that a first pole of the movable magnet is adjacent to the first pole of the stationary magnet and a second pole of the movable magnet is proximate to the contact surface of the adjusting member, wherein the movable magnet is longitudinally displaceable relative to the stationary magnet, and
    wherein a top surface of the movable magnet adjacent to the second pole is arranged to engage the contact surface of the adjusting member such that a longitudinal displacement of the adjusting member towards the distal end of the body tube displaces the movable magnet towards the stationary magnet, thereby causing a magnetic flux field of the stationary magnet to extend away from a longitudinal axis of the stationary magnet and a magnetic flux field of the movable magnet to extend away from a longitudinal axis of the movable magnet; and
  a magnetically-triggered proximity switch having a sensor, the proximity switch disposed external to the bore and adapted to be fixed to a portion of the valve enclosure, wherein the sensor is adapted to detect the magnetic flux field of the stationary magnet or the magnetic flux field of the movable magnet when the magnetic target is within a predetermined distance of the sensor.

2. The magnetic target assembly of claim 1, wherein the bore has a threaded portion adjacent to the proximal end adapted to couple to a threaded portion of the engagement portion of the adjusting member such that a rotation of the adjusting member relative to the body tube results in the longitudinal displacement of the adjusting member.

3. The magnetic target assembly of claim 2, wherein the adjustment portion comprises a flanged end integrally formed with the engagement portion.

4. The magnetic target assembly of claim 1, wherein the first pole of both the stationary magnet and the movable magnet is north, and the second pole of both the stationary magnet and the movable magnet is south.

5. The magnetic target assembly of claim 1, wherein the first pole of both the stationary magnet and the movable magnet is south, and the second pole of both the stationary magnet and the movable magnet is north.

6. The magnetic target assembly of claim 1, wherein the stationary magnet and the movable magnet are both cylindrical axially-magnetized samarium-cobalt magnets or are both cylindrical axially-magnetized neodymium magnets.

7. A system of determining the position of a valve element comprising:
  a valve disposed within a housing, the valve having a gate coupled to a valve stem;
  a magnetic target coupled to the valve stem, the magnetic target comprising:
  a body tube having an open proximal end, a distal end opposite the proximate end, and a distal surface adjacent to the distal end, the open end defining a bore longitudinally disposed within the body tube;
  an adjusting member having an adjustment portion, an engagement portion coupled to the adjustment portion, and a contact surface disposed adjacent to a distal end of the engagement portion, wherein the engagement portion is received into the bore and is displaceably coupled to the body tube;
  a stationary magnet disposed within the bore such that a second pole of the stationary magnet is proximate to the distal end of the body tube and a first pole of the stationary magnet is opposite the second pole; and a movable magnet disposed within the bore between the adjusting member and the stationary magnet such that a first pole of the movable magnet is adjacent to the first pole of the stationary magnet and a second pole of the movable magnet is proximate to the contact surface of the adjusting member, wherein a top surface of the movable magnet adjacent to the second pole is arranged to engage the contact surface of the adjusting member such that a longitudinal displacement of the adjusting member towards the distal end of the body tube displaces the movable magnet towards the stationary magnet, thereby causing a magnetic flux field of the stationary magnet to extend away from a longitudinal axis of the stationary magnet and a magnetic flux field of the movable magnet to extend away from a longitudinal axis of the movable magnet; and a magnetically-triggered proximity switch having a sensor at a proximate end of the switch, the switch being stationary and disposed outside of the housing, wherein the sensor is adapted to detect the magnetic flux field of the stationary magnet or the magnetic flux field of the movable magnet.

8. The system of determining the position of a valve element of claim 7, wherein the stationary magnet and the movable magnet are both cylindrical axially-magnetized samarium-cobalt magnets or are both cylindrical axially-magnetized neodymium magnets.

9. The system of determining the position of a valve element of claim 7, wherein the bore has a threaded portion adjacent to the proximal end adapted to couple to a threaded portion of the engagement portion of the adjusting member such that a rotation of the adjusting member relative to the body tube results in the longitudinal displacement of the adjusting member.

10. The system of determining the position of a valve element of claim 7, wherein the adjustment portion comprises a flanged end integrally formed with the engagement portion.

11. The system of determining the position of a valve element of claim 7, wherein the first pole of both the stationary magnet and the movable magnet is north, and the second pole of both the stationary magnet and the movable magnet is south.

12. The system of determining the position of a valve element of claim 7, wherein the first pole of both the stationary magnet and the movable magnet is south, and the second pole of both the stationary magnet and the movable magnet is north.

13. The system of determining the position of a valve element of claim 7, wherein the housing is a contained housing.

14. A method for simulating the magnetic flux field of a radially-magnetized permanent magnet using two axially-magnetized permanent magnets, the method comprising:

providing an axially-magnetized first permanent magnet having a first pole, a second pole, and a first magnetic flux field;

providing an axially-magnetized second permanent magnet having a first pole, a second pole, and a second magnetic flux field;

positioning the first permanent magnet and the second permanent magnet within a bore of a body tube such that a longitudinal axis of the first permanent magnet is substantially coaxial with a longitudinal axis of the second permanent magnet, and the first pole of the first permanent magnet is proximate to the first pole of the second permanent magnet, wherein the first permanent magnet and the second permanent magnet are separated by a longitudinal distance;

providing a mechanism to reduce the longitudinal distance between the first permanent magnet and the second permanent magnet, thereby causing the first magnetic flux field of the first permanent magnet to extend away from a longitudinal axis of the first permanent magnet and the second magnetic flux field of the second permanent magnet to extend away from a longitudinal axis of the second permanent magnet;

providing a sensor external to the body tube to detect at least one of the first magnetic flux field and the second magnetic flux field, wherein the sensor generates a signal when the sensor detects at least one of the first magnetic flux field and the second magnetic flux field; and sending the signal to a controller to generate an alert indicating that the sensor detects at least one of the first magnetic flux field and the second magnetic flux field.

15. The method of claim 14, wherein the first permanent magnet and the second permanent magnet are both cylindrical axially-magnetized samarium-cobalt magnets or are both cylindrical axially-magnetized neodymium magnets.

16. The method of claim 14, wherein the first pole of both the first and second permanent magnets is north, and the second pole of both the first and second permanent magnets is south.

17. The method of claim 14, wherein the first pole of both the first and second permanent magnets is south, and the second pole of both the first and second permanent magnets is north.

18. The method of claim 14, wherein the mechanism to reduce the longitudinal distance between the first permanent magnet and the second permanent magnet comprises an adjusting member having a threaded portion that engages a threaded portion within the bore of the body tube such that a rotation of the adjusting member relative to the body tube results in the longitudinal displacement of the adjusting member.

19. The method of claim 14, further comprising:

providing a valve having a displaceable gate within a contained valve housing, the gate being secured to a displaceable valve stem;

coupling the mechanism to reduce the longitudinal distance between the first permanent magnet and the second permanent magnet to the body tube and securing the body tube to the valve stem; and positioning the sensor outside of the valve housing, the sensor being capable of detecting at least one of the first magnetic flux field or the second magnetic flux field when the valve stem is displaced to a desired location.

20. The method of claim 14, wherein the sensor is a proximity switch.

21. A method for simulating the magnetic flux field of a radially-magnetized permanent magnet using two axially-magnetized permanent magnets, the method comprising:

providing an axially-magnetized first permanent magnet having a first pole, a second pole, and a first magnetic flux field;

providing an axially-magnetized second permanent magnet having a first pole, a second pole, and a second magnetic flux field;

positioning the first permanent magnet and the second permanent magnet such that a longitudinal axis of the first permanent magnet is substantially coaxial with a longitudinal axis of the second permanent magnet, and the first pole of the first permanent magnet is proximate to the first pole of the second permanent magnet, wherein the first permanent magnet and the second permanent magnet are separated by a longitudinal distance;

providing a mechanism to reduce the longitudinal distance between the first permanent magnet and the second permanent magnet, thereby causing the first magnetic flux field of the first permanent magnet to extend away from a longitudinal axis of the first permanent magnet and the second magnetic flux field of the second permanent magnet to extend away from a longitudinal axis of the second permanent magnet;

providing a valve having a displaceable gate within a contained valve housing, the gate being secured to a displaceable valve stem;

coupling the mechanism to reduce the longitudinal distance between the first permanent magnet and the second permanent magnet to the body tube and securing the body tube to the valve stem; and providing a sensor outside of the valve housing, the sensor being capable of detecting either the first magnetic flux field or the second magnetic flux field when the valve stem is displaced to a desired location.

* * * * *